March 5, 1935.　　　　　F. MERON　　　　　1,993,245
TRANSPORTING AND HOISTING UNDERCARRIAGE
Filed Dec. 7, 1931　　　2 Sheets-Sheet 2
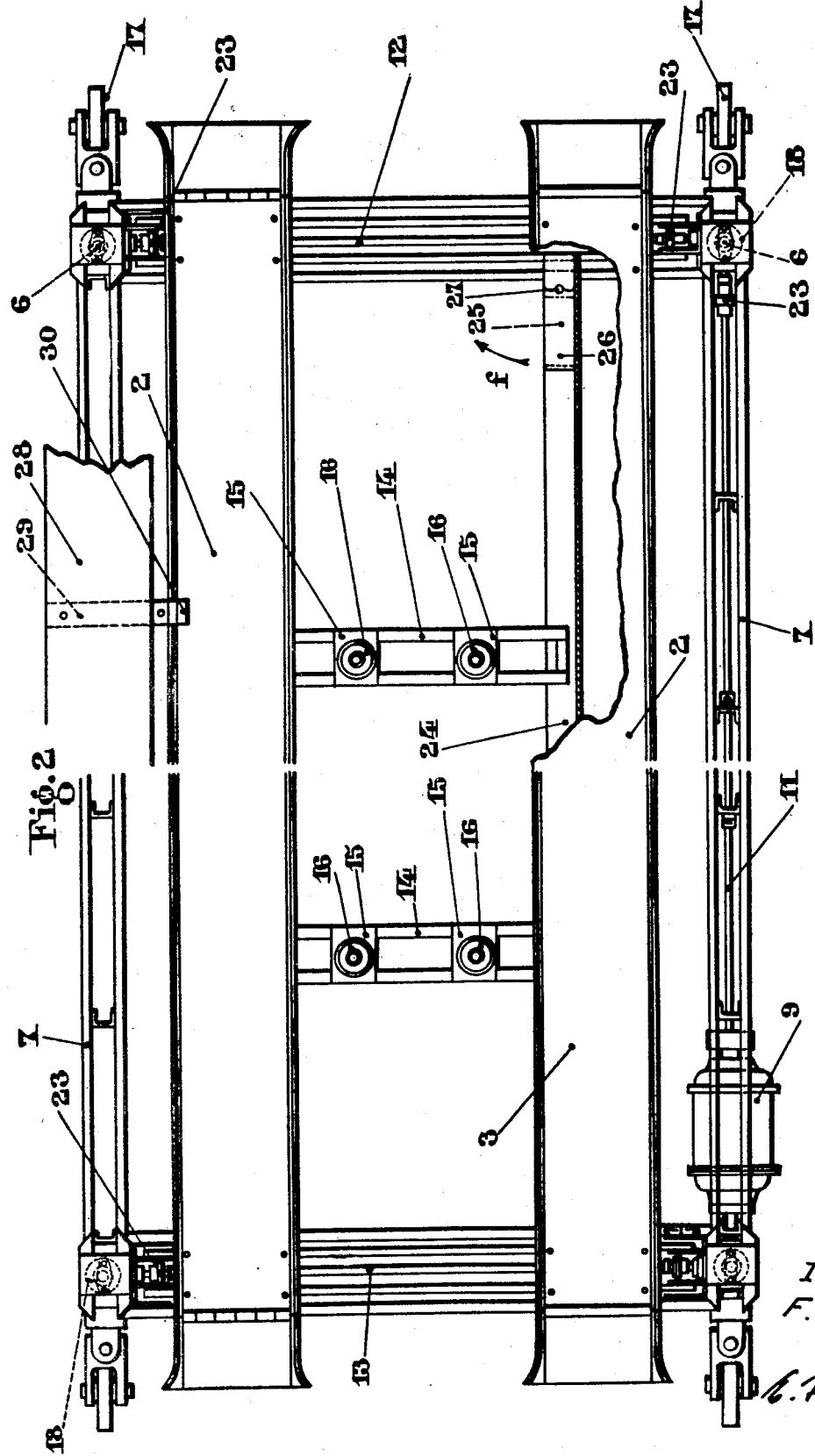
Inventor:
F. Meron,
by C. F. Wenderoth
Atty.

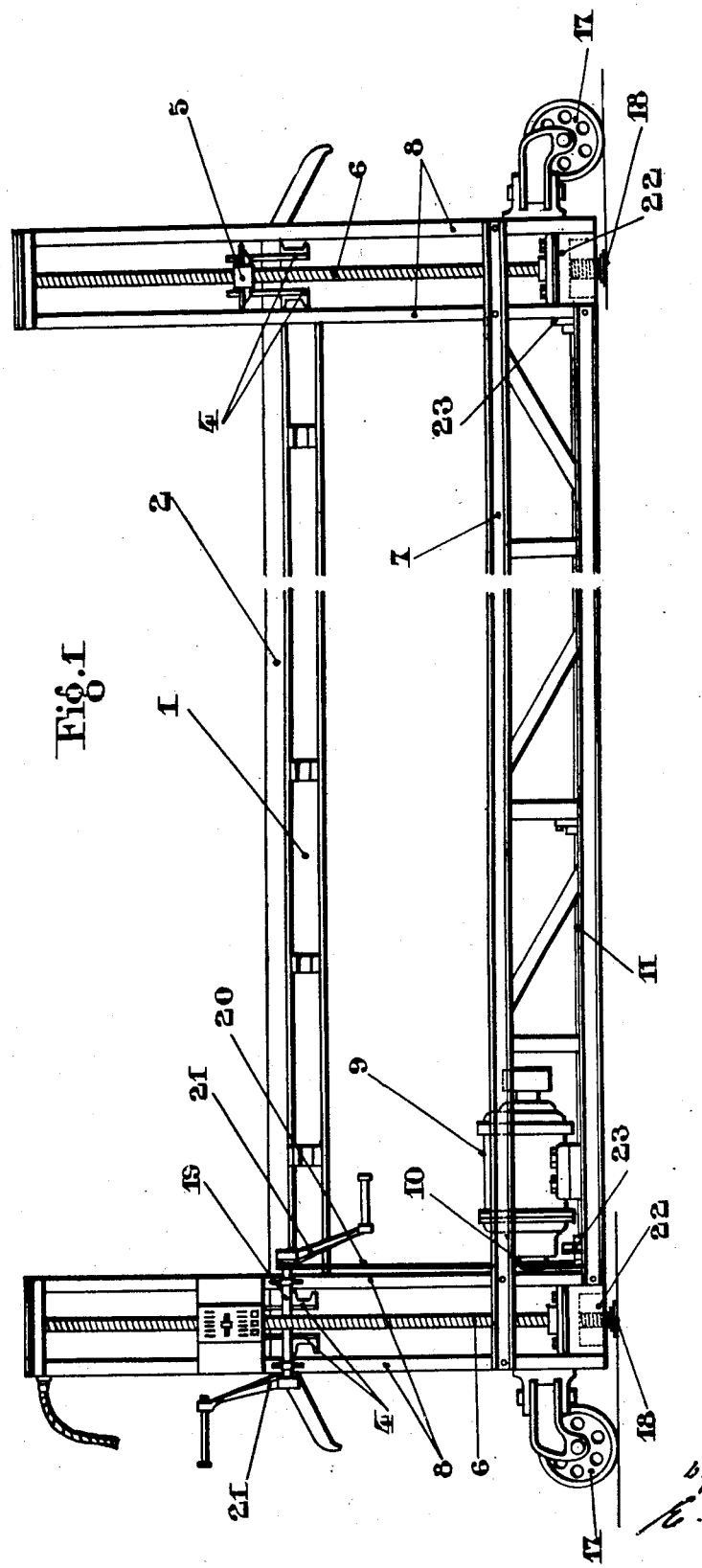

Patented Mar. 5, 1935

1,993,245

UNITED STATES PATENT OFFICE 1,993,245

TRANSPORTING AND HOISTING UNDER-CARRIAGE

Frederic Meron, Paris, France

Application December 7, 1931, Serial No. 579,634
In France August 4, 1931

1 Claim. (Cl. 254—7)

The object of the present invention is a hoisting truck or under-carriage intended for the purpose of transporting, and maintaining at a certain height above the ground of, automobile vehicles for the repair or maintenance of which it is indispensable to gain ready access to those parts which are positioned underneath the vehicle proper.

The truck or under-carriage which forms the subject matter of the present invention is more particularly characterized by the following improvements which relate to:

1. The providing of screws vertically positioned at each one of the four corners of the main frame and rotationally driven by an electric motor through gears solid with said screws, for the purpose of hoisting the movable frame supporting the run-ways, said screws being provided with nuts, integral with the movable frame, in such a manner that rotation of the said screws determines a vertical displacement of the movable frame;

2. The providing of a device for automatically arresting the movement of the movable frame both at the upper and lower end of its run, said device being constituted by stops fixed on the frame and operating circuit breakers positioned both at the upper and lower portion of the main frame uprights;

3. The positioning of the gears driving the screws rotationally in leak-proof housings filled with lubricant;

4. The providing of a method of assembling and disassembling the transmission shafts positioned between the motor and the gears enclosed within the housings according to 3, said shafts being connected by couplings, positioned outside the housings, to stub shafts integral with the gears and which protrude beyond the housings;

5. The providing of movable cross members capable of sliding on the run-ways, between the U irons which constitute the said run-ways, so that it may be possible to position them, transversally, at any selected point along the length of the movable frame;

6. The providing on the cross members as described in 5 of hoisting jacks capable of sliding transversally on said cross members so that the jacks may be positioned at any selected point along the width of the movable frame comprised between the run-ways, the assembly of which is made up of the cross members according to 5 and of the jacks sliding on the cross members thus making it possible to position the jacks under any selected point of the axles or of the chassis of the vehicle loaded onto the movable frame and thus to lift the vehicle by this point;

7. The providing of trap doors at the ends of the cross member sliding ways which permit of uncovering openings which make it possible to remove the cross members.

8. The providing at each of the four corners of the main frame of fixed hoisting jacks positioned according to the axis of the screws as set forth in 1, the object of said fixed jacks being to hold the apparatus in any position in which it may have been placed after being moved and to set it perfectly level however much out of level the ground may be at this particular spot;

9. The arrangement of loading ramps leading to the run ways, said ramps being articulated and capable of being raised vertically when the vehicle has been placed on the apparatus in such a manner that the hoist may provide a box in which the vehicle is safe from any damage which might be caused to it by the handling of other vehicles outside;

10. The providing of a secondary control of the transmission shaft which drives the hoisting screws, this device being constituted by a shaft on which are keyed two hand operated cranks;

11. A clutch device which makes it possible, by operating a single lever, to change over the drive from the motor to hand control and vice versa, thus making it possible to utilize the apparatus even in the event of a break-down in the electric current;

12. A special conformation of the raising screws when the apparatuses are intended to raise the movable frame to a great height (up to thirteen feet for instance), the screws in this case being made of large diameter tubing with an outside thread in order to avoid buckling;

13. The provision of removable foot-plates which can be positioned on either side of the frame and which are made of planking fixed to hooks suitably shaped to fit exactly onto the outer flanges of the U irons which form the run ways.

On the attached drawings:

Figure 1 is an elevation of a hoisting apparatus built conformably with the invention;

Figure 2 is a plan view of the same apparatus.

As will be seen on the drawings, in the apparatus improved conformably with the invention, frame 1 which is movable in a vertical direction and which supports the two run ways 2 and 3, is positively connected, at its extremities, by cross members 4 to nuts 5 which engage with square threaded vertical screws 6.

There are four such screws 6 (one at each corner of the apparatus) and they are pivoted on main frame 7 which is integral with uprights 8 in which the screws are suitably guided and retained by stops. In cases where the load has to be raised to a great height (up to thirteen feet for instance), the screws might be constituted by large diameter tubes provided with an outside thread in order to avoid buckling.

Screws 6 may be rotationally driven by an electric motor 9 fixed on main frame 7 which drives a longitudinal shaft 11, through a train of gearing 10, said longitudinal shaft in turn driving transverse shafts 12 and 13 and at the same speed. These shafts (11, 12 and 13) drive screws 6 rotationally through bevel gears.

The rotation of screws 6 in one direction or another causes frame 1, which supports the run ways, to rise or fall vertically.

The gears which drive screws 6 rotationally are positioned in housings 22 which are absolutely leak-proof and into which oil or grease has been introduced; each of the gears is keyed to a stub shaft which protrudes beyond the housing and which is made integral with the drive shaft (11, 12, 13) by a coupling 23, these couplings being provided for the purpose of dismantling or fitting the drive shafts easily without the necessity of touching the gears or the housings in which they are enclosed. An automatic stopping device for arresting the movement of movable frame 1 at the top and at the bottom end of its run has been provided, said device being constituted by checks fixed to the movable frame and capable of actuating current breaking organs fitted at the upper and lower portions of uprights 8.

Between U irons 2 and 3 which form the run ways are positioned cross members 14 which rest at their extremities on U irons 24 integral with the run ways and which are free to slide in the run ways in such a way that said cross members 14 may be moved longitudinally and take up any position in this direction.

The bases 15 of the hoisting-jacks 16 are capable of sliding transversally along cross members 14, twelve of the said hoisting jacks being preferably provided and being capable of sliding along the entire length of cross members 14 in order to take up any selected transverse position between the two run ways.

Owing to the latter arrangement it will always be possible, whatever the track or model of the vehicle loaded on the movable frame, to bring any one of jacks 16 beneath any selected point of the vehicle in order to raise it precisely by the said point and by the action of jacks 16 themselves.

This arrangement will therefore make it possible to raise above the movable frame any one of the axles, or any one of the wheels, or all the wheels at the same time, the apparatus being usually provided with two cross members 14.

For the purpose of making it possible to remove the cross members in case of need (in the event for instance of its being desired to bring the run ways closer together in order to accommodate a vehicle with a narrower track than that provided for on the apparatus), openings 25 which are normally kept closed by trap-doors 26 articulated on the members themselves, are provided at the ends of iron members 24; when it is desired to remove cross members 14 it is sufficient to uncover openings 25 by rotating trap doors 26 in the direction of arrow $f$; the cross members being brought above the opening then drop naturally below the run ways which may then be displaced.

In the specification of the copending application 422,446 filed January 21, 1930, it has been stated that the apparatus rests on four wheels 17, which are capable of rotating in all directions and which are positioned at each of the four corners of the apparatus in order to render it readily movable in all directions.

Conformably with the invention fixed hoisting jacks 18 have been added to this system of wheels; these are raised when the apparatus is being moved and brought into action when the hoist has been brought to the selected spot.

By acting on said hoisting-jacks 18 the apparatus rests firmly on the ground and wheels 17 are slightly raised; any untimely displacement of the hoist while work is being carried out is thus avoided; on the other hand whatever differences in the level of the ground there may be at the place in which work is being carried out it is possible, by actuating the hoisting jacks to varying extents, to render the apparatus perfectly level which facilitates its functioning, ensures perfect balancing of the load and prevents any abnormal stressing of the screws or of the parts by which they are controlled.

The apparatus is completed by an auxiliary shaft 19 which also actuates shaft 11 through a chain 20; shaft 19 can be rotationally driven by hand, in the event of the failure of motor 9 by means of the two hand cranks 21.

A device for clutching and unclutching makes it possible, by the mere operation of a lever, to go from power drive to hand drive and vice versa, as this operation may become necessary in order to continue making use of the apparatus in the event of failure of the electric current.

The loading ramps leading to the run ways are articulated and they are capable of being raised vertically, when a vehicle is placed on the hoist, so that the apparatus forms a sort of box in which the vehicle is safe from any damage which it might sustain in consequence of the handling of other vehicles outside. Removable foot-plates can be placed on the sides of the run ways in order to make it easier to carry out an examination of the vehicles loaded; said foot-plates are constituted by planks 28 bolted onto brackets 29 provided with hooks 30 suitably shaped to hook exactly onto the outer flanges of the U irons which form the run ways.

It should be understood that the method of embodiment of the invention herein described and represented on the attached drawings is given merely as an example and that modifications may be made without such modifications causing any departure from the characteristics of the invention.

What I claim is:

A hoisting apparatus of the type described comprising, in combination, a main-frame, a movable frame supporting run ways, removable cross members capable of sliding on said run ways, openings provided at the extremities of said run ways making it possible to remove the cross members, pivoting trap-doors capable of covering and uncovering, as the case may be, the said openings, and means for causing the displacement of the movable frame relatively to the main-frame.

FREDERIC MERON.